A. W. Loomis,
Making Stone-Ware.
No 83,515.    Patented Oct. 27, 1868.
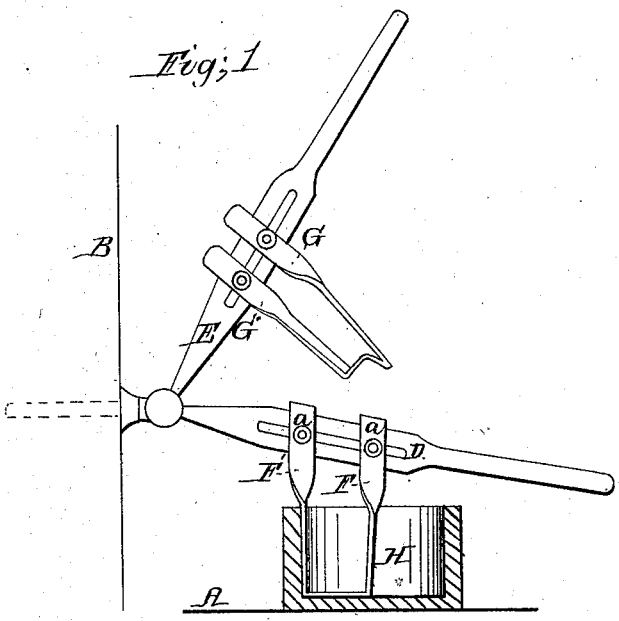
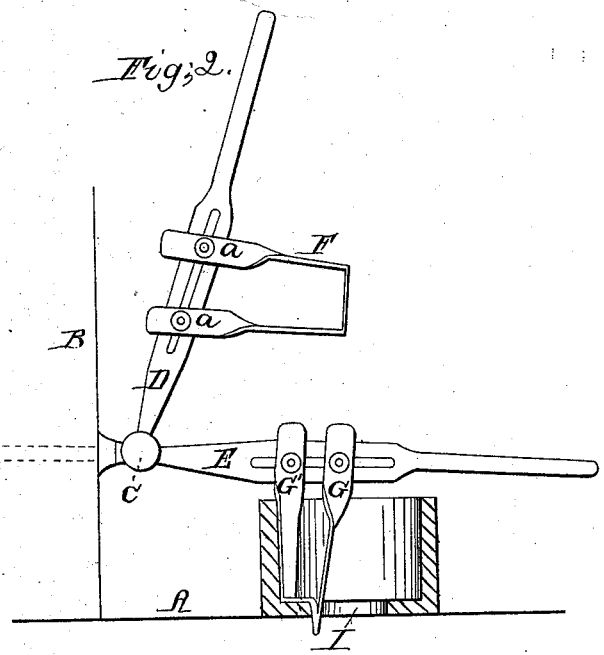
Witnesses:
J. H. Burridge
Frank S. Alden
Inventor;
A. W. Loomis

United States Patent Office.

A. W. LOOMIS, OF ATWATER, OHIO.

Letters Patent No. 83,515, dated October 27, 1868.

GAUGE FOR STONE-WARE.

The Schedule referred to in these Letters Patent and making part of the same.

*To all whom it may concern:*

Be it known that I, A. W. LOOMIS, of Atwater, in the county of Portage, and State of Ohio, have invented certain new and useful Improvements in Gauges for Manufacturing Stone-Ware; and I do hereby declare that the following is a full and complete description of the same, reference being had to the accompanying drawings, making a part of this specification, in which—

Figures 1 and 2 are side views of the gauges, shown in different positions.

Like letters of reference refer to like parts in the several views.

The nature of this invention relates to a gauge, so constructed and arranged that the inside of articles of stone-ware are fashioned and smoothed to a given and uniform size, obtaining thereby a truthfulness in their holding-capacity, and a smoothness of finish unobtained in the ordinary way of manufacture.

In fig. 1, A represents the turn-table or wheel, on which the clay is placed and fashioned. Near to this table is an upright post or standard, B, into which is screwed a stay, C. In said stay is pivoted one end of the levers D E, as represented.

F is the gauge, and which is attached to the lever by means of set-screws, $a$, passed through the lever in a slot, $b$, whereby said gauge may be adjusted, as and for a purpose hereinafter shown.

It will be observed that gauge F is constructed with two right angles, whereas gauge G consists of but one angle, provided with a dependent point, H, whereby is formed a slightly rounded shoulder at the point $x$, fig. 2, the purpose of which will hereinafter be shown.

Fruit-jars of stone-ware are usually made in two parts, the upper and lower, each being fashioned by hand, which are then carefully put together, and the joint smoothed down even with the surface of the jar.

In consequence of their being made in two parts, great care and skill are required to be exercised in order to make the two parts of an exact diameter, so that they shall produce, when together, an even surface. This, however, is a matter not easily performed, and the jars, in consequence, are often irregular in shape, and not uniform in size.

In order to lessen this trouble and care, is the purpose of this invention, the operation of which is as follows, viz:

A lump of clay, of the proper size for the lower part of the jar, is placed upon the wheel. This is rudely fashioned by hand near to the required shape and size.

The gauge F is then introduced in the section, as shown in fig. 1, in which it will be seen that the gauge in width is just one-half the diameter of the inside of the jar, so that as the jar revolves, one-half of the bottom passes under the gauge, whereby it is worked and levelled down to the proper thickness, and smoothed off.

The sides also are worked and smoothed off by the limb F' of the gauge, against which the side of the jar rubs as it is whirled around.

This gauge being adjusted at a certain distance on the handle E, will, as a consequence, expand the clay on the side of the vessel as far as the outside of the limb of the gauge; hence the sides of each jar will be acted upon by the gauge at the same vertical line, and therefore all the jars will have an equal internal diameter. The depth of each part being determined by a mark on the gauge, all the parts will have an equal depth.

The top of the jar is made in a similar way. The material being rudely shaped near to the required size, the gauge is then inserted in the half-fashioned top. The point $a$, referred to, is made to enter the opening or mouth of the jar I, fig. 2. As the clay revolves, the gauge is gradually brought to a vertical position, as shown, and which, being adjusted on the lever at the same distance as that above described, the sides will be expanded to the same vertical line; hence the top will be of the exact diameter of the bottom. At the same time the sides are smoothed off, and the inner edge of the opening or mouth, I, rounded by the shoulder $x$.

By this means, it will be evident that the top and lower parts of the jar will be of an equal diameter, so that when the two parts are put together, they will exactly correspond; hence little or no trouble will be found in uniting them.

Any number of jars made in this way will have their holding-capacity equal, and an internal smoothness of finish not obtained in the ordinary way of manufacture.

What I claim as my invention, and desire to secure by Letters Patent, is—

The adjustable gauges G and F, in combination with the handles D E, when arranged in relation to a potter's wheel, in the manner as and for the purpose specified.

- A. W. LOOMIS.

Witnesses:
J. H. BURRIDGE,
FRANK S. ALDEN.